UNITED STATES PATENT OFFICE.

LEOPOLD NOBIS AND AUGUSTIN WENZEL, OF VIENNA, AUSTRIA-HUNGARY.

PROCESS OF PRODUCING ELASTIC CONCRETE MATERIAL.

SPECIFICATION forming part of Letters Patent No. 679,158, dated July 23, 1901.

Application filed April 24, 1901. Serial No. 57,321. (No specimens.)

*To all whom it may concern:*

Be it known that we, LEOPOLD NOBIS, officially-authorized civil engineer, of 20 Rennweg, Vienna III, and AUGUSTIN WENZEL, commercial partner, of 47 Margarethenstrasse, Vienna IV, Austria-Hungary, have invented a new and useful Improvement in Processes for the Production of Elastic Well-Resisting Concrete Material, of which the following is a clear and exact description.

The present invention concerns a process for producing an elastic concrete material of high resistance and dense structure which is particularly suited for filling in or lining the sides of vessels or vats for the most various industrial purposes and which consists of blast-furnace slag, "asbestic," Portland cement, and asbestos-powder, with insertions of specially-prepared braids or plaits of asbestos tissue.

The vessels lined with this concrete substance will resist a high pressure exerted on their surfaces and, moreover, possess a high degree of indeformability and durability, their walls being rendered waterproof to a high degree and possessing a high degree of non-conductivity of heat.

This concrete material is prepared according to the following process of granulated and pulverized blast-furnace slag, asbestic, Portland cement, and asbestos-powder, with insertions of specially-prepared braids or plaits of asbestos tissue. The blast-furnace slag is first well mixed with the asbestic and the Portland cement with the asbestos-powder. Then the latter mixture is added to the former and the whole is again well mixed up, and after adding a sufficient quantity of water it is well mixed with a shovel.

A good concrete material meeting all requirements will be obtained by mixing the various materials in the following percentages of volume: granulated and pulverized blast-furnace slag, thirty-five to fifty per cent.; asbestic, forty to thirty per cent.; Portland cement, twenty to sixteen per cent., and asbestos-powder five to four per cent. The concrete material thus prepared is now introduced in layers from two to four centimeters high and is then rammed down. Into each of these layers insertions of specially-prepared asbestos-tissue plaits or braids are laid, the number varying according to the thickness of the side and the purpose for which the vessel is to be used. The braids or plaits are placed in parallel position to the side of the vessel at intervals of from one to three centimeters. By these insertions the tensile strength of the concrete material is materially increased without appreciably reducing the homogeneousness of the substance. The mode of production of these insertions is as follows: Asbestos plaits from two to five millimeters thick, in lengths of four to six meters, are stretched on a frame and, in the first place, impregnated in a thin liquid bath and thereupon coated in a second thicker bath with a mineral coating. The bath consists of a mixture of from fifty to sixty-five per cent. of powdered glass and from fifty to thirty-five per cent. of powdered asbestos, to which mixture a sufficient quantity of water-glass at a temperature of 35° to 50° centigrade is added to make the compound for the first bath thinly liquid and for the second bath a thickish liquid, which coats the asbestos fibers, adheres well to them, and quickly dries.

The concrete material prepared according to the process just described and provided with the asbestos insertions just described possesses great homogeneousness, a dense texture, great elasticity, and considerable tensile strength. The specific gravity is from 1.80 to 1.90, the tensile strength from twenty-five to forty kilos per square centimeter, and the coefficient of elasticity is from forty thousand to seventy thousand per square centimeter. The elasticity is almost perfect and constant, the limit of elasticity being situate twenty per cent. only below the fracture limit. In view of these static properties this concrete substance possesses in a high degree the capability, on being combined with iron to a supporting system, to yield the elastic deformation and sufficiently resist the strain entailed thereby. For this reason this substance is also particularly suited for lining the sides of iron vessels—such as, for instance, iron cellulose boilers—more especially as in consequence of the large percentage it contains of asbestic and asbestos it is highly non-conducting, thus reducing the loss of heat or waste of steam during the boiling process to a minimum.

What we claim as our invention, and desire to secure by Letters Patent, is—

The process for the production of a tough, resisting concrete material, which is particularly suited for the production of vessels constructed of concrete and iron, and for lining iron vessels, more especially cellulose boilers, characterized by the circumstance that it is prepared by mixing blast-furnace slag, "asbestic," Portland cement and asbestos-powder, with a sufficient addition of water, in which substance are introduced the asbestos insertions consisting of asbestos braids or plaits, which are impregnated in a thin liquid bath of powdered glass, asbestos-powder and water-glass, and thereupon coated with a mineral coating, by means of a similar, but thickly-liquid bath.

In testimony that we claim the foregoing as our invention we have signed our names in presence of two subscribing witnesses.

LEOPOLD NOBIS.
AUGUSTIN WENZEL.

Witnesses:
ALVESTO S. HOGUE,
ALBERT BENCKE.